(12) United States Patent
Goldschmidt et al.

(10) Patent No.: US 10,416,661 B2
(45) Date of Patent: Sep. 17, 2019

(54) APPARATUSES, SYSTEMS AND METHODS OF SECURE CLOUD-BASED MONITORING OF INDUSTRIAL PLANTS

(71) Applicant: ABB Schweiz AG, Baden (CH)

(72) Inventors: Thomas Goldschmidt, Karlsdorf-Neuthard (DE); Jeffrey Harding, Holly Springs, NC (US)

(73) Assignee: ABB SCHWEIZ AG, Baden (CH)

( * ) Notice: Subject to any disclaimer, the term of this patent is extended or adjusted under 35 U.S.C. 154(b) by 148 days.

(21) Appl. No.: 15/826,830

(22) Filed: Nov. 30, 2017

(65) Prior Publication Data
US 2019/0163173 A1    May 30, 2019

(51) Int. Cl.
*G05B 23/02* (2006.01)
*G06F 21/00* (2013.01)
*H04L 29/06* (2006.01)
*G06F 16/00* (2019.01)

(52) U.S. Cl.
CPC ..... *G05B 23/0267* (2013.01); *G05B 23/0243* (2013.01); *G06F 16/00* (2019.01); *G06F 21/00* (2013.01); *H04L 63/00* (2013.01); *G05B 2223/06* (2018.08)

(58) Field of Classification Search
CPC ............ G05B 23/0267; G05B 23/0243; H04L 63/0815
See application file for complete search history.

(56) References Cited

U.S. PATENT DOCUMENTS 6,263,342 B1   7/2001  Chang et al.
7,389,295 B2   6/2008  Jung et al.
7,523,118 B2   4/2009  Friedlander et al.
7,849,069 B2   12/2010 Liu et al.
8,296,303 B2   10/2012 Navas
2004/0117624 A1  6/2004  Brandt
2010/0257410 A1  10/2010 Cottrell
2013/0212214 A1  8/2013  Lawson et al.
(Continued)

FOREIGN PATENT DOCUMENTS

EP    1770464 A2    4/2007

OTHER PUBLICATIONS

International Search Report and Written Opinion, PCT Appln. No. PCT/US2018/062424, 15 pgs.

*Primary Examiner* — Mohammad Ali
*Assistant Examiner* — Vincent W Chang
(74) *Attorney, Agent, or Firm* — Taft Stettinius & Hollister LLP; J. Bruce Schelkopf

(57) ABSTRACT

Unique systems, methods, techniques and apparatuses of remote monitoring for industrial systems are disclosed. One exemplary embodiment is a system for remote monitoring of an industrial plant, the system comprising a cloud-based computing component structured to store and to access a cloud portion of a federated information model; a plurality of industrial plant-based gateway components each structured to store and to access respective gateway portions of the federated information model, the respective gateway portions of the federated information model being isolated from access by the cloud-based computing component; and a plurality of industrial plant asset controllers, each of the asset controllers structured to store and to access respective asset portions of the federated information model.

20 Claims, 3 Drawing Sheets

(56) References Cited

U.S. PATENT DOCUMENTS

| | | |
|---|---|---|
| 2014/0047064 A1 | 2/2014 | Maturana |
| 2014/0104045 A1 | 4/2014 | Haberlein |
| 2015/0077263 A1 | 3/2015 | Mohanmed |
| 2015/0281356 A1* | 10/2015 | Maturana ............ H04L 67/1097 709/217 |
| 2016/0063271 A1* | 3/2016 | Bartlett ................... G06F 16/13 726/28 |
| 2016/0132595 A1 | 5/2016 | Bliss et al. |
| 2016/0292895 A1* | 10/2016 | Billi ........................ G06T 11/60 |
| 2017/0199515 A1 | 7/2017 | Bhat |
| 2017/0248944 A1 | 8/2017 | Rath et al. |
| 2017/0351226 A1* | 12/2017 | Bliss .................... G05B 13/042 |
| 2018/0088566 A1* | 3/2018 | Billi-Duran ...... G05B 19/41885 |

* cited by examiner

APPARATUSES, SYSTEMS AND METHODS OF SECURE CLOUD-BASED MONITORING OF INDUSTRIAL PLANTS

BACKGROUND

The present disclosure relates generally to remote monitoring of industrial plants. With the advent of cloud computing systems, it is now possible for users at any network accessible location to initiate queries of any network accessible remote computing systems which are performed by a cloud computing system. Generally speaking, these techniques could be applied to a variety of computing systems including industrial plants, for example, by gather monitored or logged data from industrial plants for analysis. This holds the promise of many benefits. For example, a cloud computing system may process aggregated data pertaining to a multitude of devices located at an industrial plant to improve plant efficiency or predict maintenance of machinery or other devices in the industrial plant. Some conventional proposals are to send all data from a complete set of data sources to a centralized processor for analysis. Such approaches are bandwidth and processing resource intensive and are insecure in that all of the data pertaining to the industrial plant resources is shared with a centralized processor. Other conventional proposals request only relevant data from each relevant data source. While potentially less bandwidth and processing resource intensive, such approaches utilize a common information model stored on the cloud may be used by the cloud system for locating data sources within each industrial plant. The common information model includes information regarding the system structures as well as the data source and data source properties of the industrial plants. This poses a significant security concern for industrial data plants. Furthermore, when system structure changes, data source properties change, or data sources are added or removed, the common information model must be updated which tends to negate the initial decrease in bandwidth ad processing resource consumption. It can thus be seen that conventional proposals for remote monitoring of industrial plants suffer from a number of shortcomings and disadvantages including those respecting security of industrial plant data and infrastructure information, increasing system reliability, processing requirements, and bandwidth requirements. There remains a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for industrial plant monitoring. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
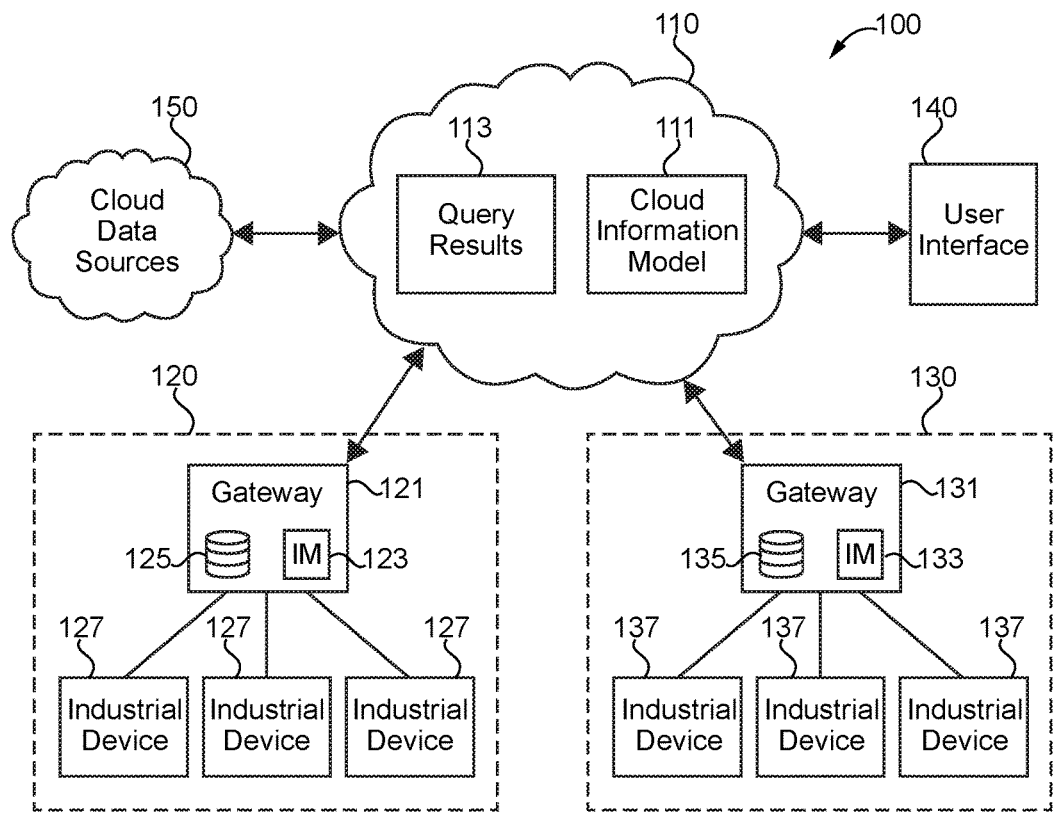
FIG. 1 is a block diagram illustrating an exemplary monitoring system.

With reference to FIG. 1 there is illustrated an exemplary monitoring system 100 for remote monitoring of an industrial plant. Monitoring system 100 is structured to organize data sources of an industrial plant using a federated information model, portions of which are stored in a plurality of devices located both in an industrial plant and on the cloud. Industrial plants in which a portion of the federated information model may be implemented include, for example, assembly line and other factory facilities, refineries, electrical substations, electrical generation plants, wind farms, solar farms, pharmaceutical plants, and other environments where data security is a material concern. It shall be appreciated that the topology of monitoring system 100 is but one example topology and that a number of other monitoring system topologies are contemplated as would occur to one of skill in the art with the benefit of the present disclosure.

Monitoring system 100 includes a cloud-based computing component such as cloud computing device 110 in communication with gateways 121 and 131 located at industrial plants 120 and 130, respectively. Cloud computing device 110 is structured to store a portion of a federated information model, cloud information model 111. The other portions of the federated information model are stored at industrial plant premises. Cloud information model 111 includes information that identifies the location of information within plant information models allowing cloud computing device 110 to distribute queries or portions of queries to the proper industrial plant gateways storing plant information models. Cloud computing device 110 is also structured to store query results 113 received from gateways 121 and 131.

Industrial plant 120 includes gateway 121 and a plurality of data sources, such as industrial devices 127. Each industrial device is structured to receive data regarding the operation of a component of industrial plant 120 and transmit the data to gateway 121. Each industrial 127 device may include a sensor, a transducer, or a user interface, to name but a few examples.

In certain embodiments, industrial device 127 is a computerized maintenance management system (CMMS), also known as computerized maintenance management information system. CMMS is an application structured to store data related to an industrial plant's maintenance operations and verify regulatory compliance. In certain embodiments, industrial device is an enterprise resource planning system (ERP) which may be provided as one or more applications operable to collect, store, manage and interpret resource data pertaining to a plurality of facility activities including, for example, raw materials, production capacity, supply chain status and costs associated with the foregoing and other parameters.

Gateway 121 is structured to store a database 125 and another portion of the federated information model, plant information model 123. Each plant information model, such as plant model 123, includes parameters of data sources, such as serial numbers and configuration values. Each plant information model may also include semantic links to identify adjacent information sources, such as a CMMS or an ERP.

Gateway 121 is structured to dispatch parts of a query received from cloud computing device 110 to parts of industrial plant 120 using the plant information model 123. For example, gateway 121 may determine a query is requesting data related to real time measurements from an industrial device 127 and then request the industrial device transmit real time data to gateway 121 in order to generate a partial query response. In another example, gateway 121 may determine a query is requesting historical data from database 125 and then request a subset of the data stored in database 123 in order to generate a partial query response. It shall be appreciated that any or all of the foregoing features of industrial plant 120 may also be present in the other industrial plants disclosed herein.

Industrial plant 130 includes gateway 121 and a plurality of data sources, such as industrial devices 137. Gateway 131 is structured to store a database 135 and another portion of the federated information model, plant information model 133.

Monitoring system 100 includes a user interface 140 structured to receive a query from a user. For example, a query may request data from a particular piece of equipment or may request data from certain types of equipment in a number of industrial plants. A query may also request data on certain types of equipment based on a local analysis of measurements performed on a type of equipment.

In the illustrated embodiment, monitoring system 100 is in communication with other cloud-based systems 150. Portions of the federated information model could also be stored in the other cloud-based systems 150. For example, an industrial plant using equipment from a third party vendor may need to integrate the vendor's cloud based data with the federated information model. In certain embodiments, monitoring system 100 is not in communication with other cloud-based systems. It shall be appreciated that any or all of the foregoing features of system 100 may also be present in the other monitoring systems disclosed herein.

It shall be appreciated that monitoring system 100 provides one example of a system for remote monitoring of an industrial plant and that a variety of other configurations are contemplated. For example, cloud computing device 110 is one example of a cloud-based computing component structured to store and to access a cloud portion of a federated information model which may be provided in a number of forms and configurations. In certain forms and configurations cloud computing device 110 may be configured to send and receive information over the public Internet, over one or more private networks or over combinations thereof. In certain forms the cloud portion of the federated information model includes query mapping information for the gateway portions of the federated information model.

Gateways 121 and 131 are examples of industrial plant-based gateway components in operative communication with a cloud-based computing component such as cloud computing device 110. In certain forms gateway components such as gateways 121 and 131 may be structured to store and to access respective gateway portions of a federated information model. Gateway portions of a federated information model may comprise information models about certain aspects of an industrial plant, for example, as provided by plant information models 123, 133, 221, 223, or 225.

Industrial devices 127 and industrial devices 137 are examples of devices which comprise industrial plant asset controllers in operative communication with at least one of gateway component, such as gateways 121 and 131 and which may be structured to store and to access respective asset portions of a federated information model, for example, device information models 231, 233 and 235.

Federated information models according to the present disclosure may be structured to provide one or multiple security layers that restrict access to industrial plant data, devices and networks, while still providing cloud level querying of relevant information of the industrial plant. Thus, using the federated information models disclosed herein, a query can be executed in a distributed manner with different system components accessing and acting on distinct portions of the federated information model providing only partial information of the overall information model effective to provide security and access restriction to relevant portions of the industrial plant network, computing devices and data, while at the same time providing comprehensive responses to queries received at the cloud component level.

The cloud-based computing component is structured to receive a user-initiated query for information of one or more assets of the industrial plant and, in response to the user-initiated query, utilize the cloud portion of the federated information model to identify one or more portions of the query associated by the cloud portion of the federated information model with one or more of the gateway components and to transmit the identified one or more portions of the query to one or more associated gateway components.

The gateway portions of the federated information model may be isolated from access by the cloud-based computing component. The industrial plant-based gateway components may also provide a firewall restricting access to a network including one or more of the industrial plant asset controllers. The gateway components are structured to receive respective one or more portions of the query and, in response to the received one or more portions of the query, utilize their respective gateway portions of the federated information model to identify one or more of the industrial plant asset controllers to interrogate using the received one or more portions of the query.

The asset portions of the federated information model may be isolated from access by the gateway components and isolated from access by the cloud-based computing component. The industrial plant asset controllers are structured to one of identify and obtain data responsive to the interrogation by the respective industrial plant-based gateway components and to transmit the identified responsive data to the respective industrial plant-based gateway components. The industrial plant-based gateway components are further structured to provide the identified responsive data to the cloud-based computing component. The cloud-based computing component is structured to utilize the identified responsive data received from the plurality of plant-based gateway components to generate an aggregated response to the user-initiated query and to output the response in a user perceptible format.

In one example, system 100 is a monitoring system for multiple electrical power plants. Cloud information model 111 includes identifying information for a plurality of power plants including power plant 120 and power plant 130. Gateway 121 of power plant 120 includes plant information model 123 configured to store identifying information of industrials devices 127 and may store identifying information of data streams associated with each industrial device. One of the industrial devices is a power generator and associated data streams may be related to output frequency, output voltage, and output current. Another industrial device may be a boiler feed pump and associated data streams may be related to speed, pump flow, and pump vibration. Gateway 133 of power plant 131 similarly includes a separate plant information model 133 configured to store identifying information of industrials devices 137.

In another example, system 100 is a monitoring system for multiple oil refineries. Cloud information model 111 includes identifying information for a plurality of oil refineries including oil refinery 120 and oil refinery 130. Gateway 121 of oil refinery 120 includes plant information model 123 configured to store identifying information of industrials devices 127 and may store identifying information of data streams associated with each industrial device. One of the industrial devices may be a distillation tower and associated data streams may be related to steam flow, feed temperature, and feed flow. Another industrial device may be a crude pump and associated data streams may be related to speed, pump flow, and pump vibration. Gateway 133 of oil refinery 131 similarly includes a separate plant information model 133 configured to store identifying information of industrials devices 137.

In still another example, system 100 is a monitoring system for multiple wind farms. Cloud information model 111 includes identifying information for a plurality of wind farms including wind farm 120 and wind farm 130. Gateway 121 of wind farm 120 includes farm information model 123 configured to store identifying information of industrials devices 127 and may store identifying information of data streams associated with each industrial device. One of the industrial devices may be a wind turbine and associated data streams may be related to wind speed, blade pitch, and output power. Gateway 133 of wind farm 131 similarly includes a separate farm information model 133 configured to store identifying information of industrials devices 137.

Figure 2:
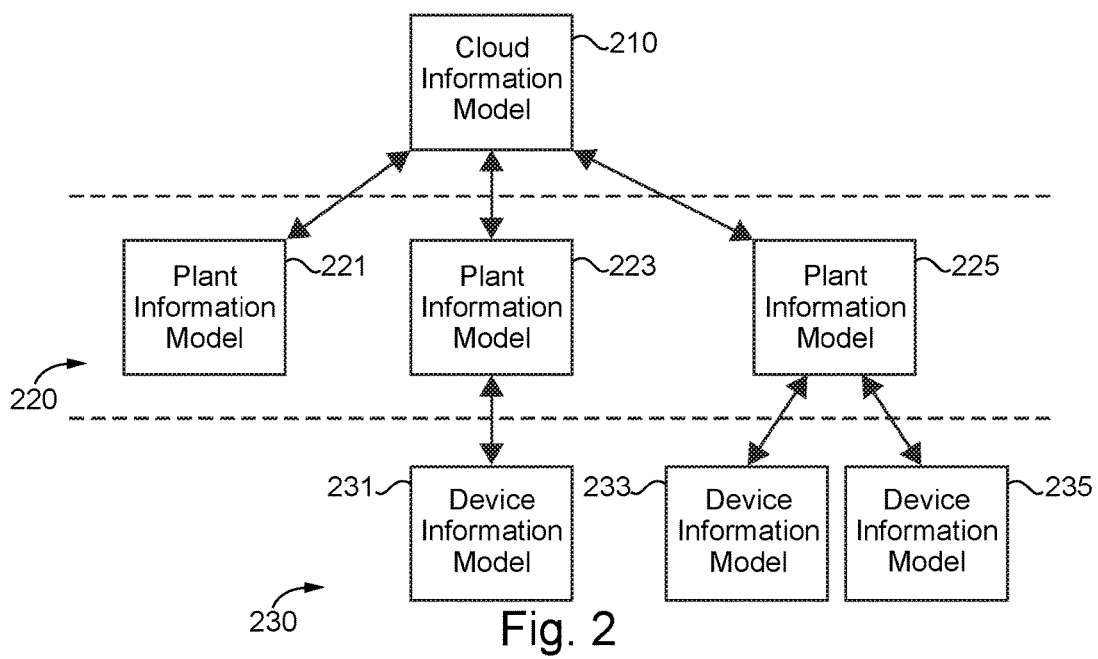
FIG. 2 is a block diagram illustrating an exemplary federated information model.

With reference to FIG. 2, there is illustrated an exemplary federated information model 200 which is structured such that it is stored on a plurality of non-transitory memory devices within distinct computing components at distinct network locations. An industrial plant monitoring system, such as monitoring system 100 in FIG. 1, uses a federated information model in order to extract knowledge from a monitored system. Federated information model 200 is structured as distributed points of knowledge which include information linking data and data semantics. By using a federated information model, as opposed to a common information model or master information model, private information does not need to be transferred outside of a plant in order to maintain a common information model.

Federated information model 200 includes a cloud information model 210 stored on a cloud device. Model 210 includes identifying information for a plurality of plant information models 220 stored on a device located in an industrial plant. The plurality of plant information models includes models 221, 223, and 225.

Federated information model 200 includes a plurality of device information models 230 including models 231, 233, and 235. Identifying information for each device information model is included in one plant information model. In the illustrated embodiment, plant information model 223 includes identifying information for device information model 231 and plant information model 225 includes identifying information for device information model 233 and 235. It shall be appreciated that any or all of the foregoing features of federated information model may also be present in the other federated information models disclosed herein.

Figure 3:
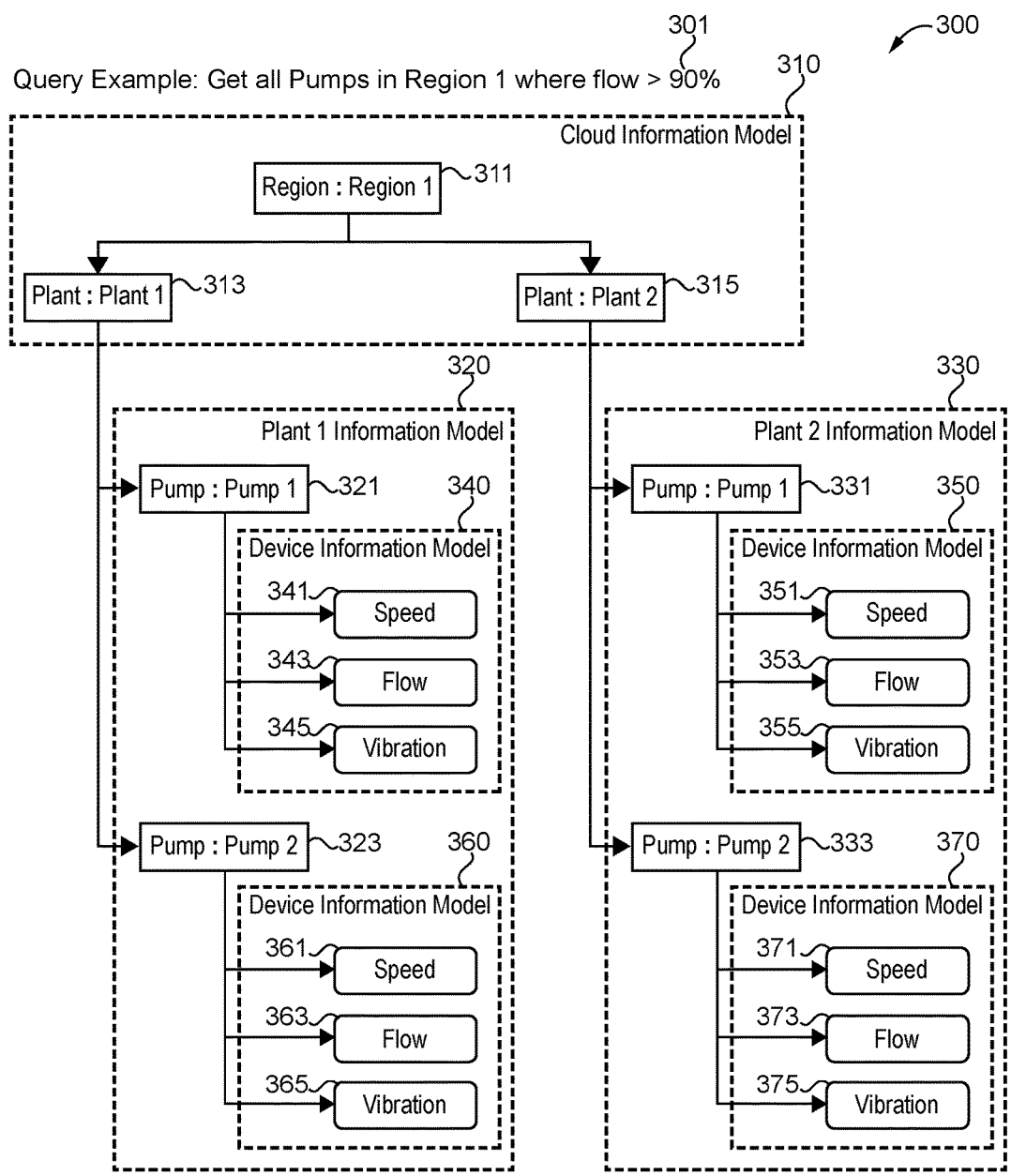
FIG. 3 is a block diagram illustrating an exemplary federated information model utilization process.

With reference to FIG. 3, there is there is a schematic block diagram illustrating an exemplary federated information model 300 executing a search query 301. Federated information model 300 includes cloud information model 310, plant information model 320, plant information model 330, device information model 340, device information model 360, device information model 350, and device information model 370. Cloud information model 310 includes region one identifying information 311, and industrial plants identifying information for industrial plant one 313 and industrial plant two 315.

Plant information model 320 includes 330 includes identifying information for devices located at plant one, including pump one identifying information 321 and pump two identifying information 323. Plant information model 330 includes identifying information for devices located at plant two, including pump one identifying information 331 and pump two identifying information 333.

Device information model 340 includes identifying information for data streams measuring characteristics of pump one, including speed data stream identifying information 341, flow data stream identifying information 343, and vibration data stream identifying information 345. Device information model 360 includes identifying information for data streams measuring characteristics of pump two, including speed identifying information data stream 361, flow data stream identifying information 363, and vibration data stream identifying information 365.

Device information model 350 includes identifying information for data streams measuring characteristics of pump one, including speed data stream identifying information 351, flow data stream identifying information 353, and vibration data stream identifying information 355. Device information model 370 includes identifying information for data streams measuring characteristics of pump two, including speed identifying information data stream 371, flow data stream identifying information 373, and vibration data stream identifying information 375.

By way of a user interface, such as user interface 140 in FIG. 1, a monitoring system receives query 301 requesting the identification information for all devices of a particular type located in a region in which one type of data observed by the device satisfies a quantitative analysis. Specifically, a user has requested the identifying information of all pumps located in region one that have a flow rate greater than 90% of total capacity.

Cloud information model 310 includes information related to region one 311 and the industrial plants 313, 315 within region one. The monitoring system divides query 301 into subqueries one subquery being transmitted to the gateway located at industrial plant one storing information model 320, and a second subquery being transmitted to the gateway located at industrial plant two storing information model 330.

The subqueries are then used to identify and analyze data streams located within industrial plants and industrial plant devices. Raw data is analyzed and transmitted back to the cloud-based computing device, where the analysis can be aggregated with results from other subqueries and sub-subqueries to form query results. For example, using plant information model 320, the gateway identifies pump 321 and 323 located within industrial plant one. The first subquery transmitted to the gateway located at industrial plant one is further subdivided into a first sub-subquery transmitted to pump one which stores device information model 340, and a second sub-subquery transmitted to pump two which stores device information model 360. Device information model 340 includes identifying information for data streams generated by sensors structured to measure characteristics of pump one. As illustrated, device information model 240 includes speed data stream identifying information 341, flow data stream identifying information 343, and a vibration data stream identifying information 345. Pump one uses device information model 340 to request data from data stream identified by flow data stream identifying information 343 and analyzes the data to determine whether flow from pump one is greater than 90% of capacity. The results of the analysis are transmitted to the gateway of industrial plant one. Due to the federated nature of the information model, raw data does not need to be transferred from the device to an industrial plant gateway or to the cloud-based computing device. Furthermore, identifying information for data streams 341, 343, and 345, do not need to be aggregated at the industrial plant level, or the cloud level of the monitoring system.

Data stream identification and data analysis is similarly performed for each of the illustrated four pumps within region one. The monitoring system identifies each device satisfying the query by receiving the results of the analysis performed at each device and aggregates the results at the cloud computing device to form a query result.

Figure 4:
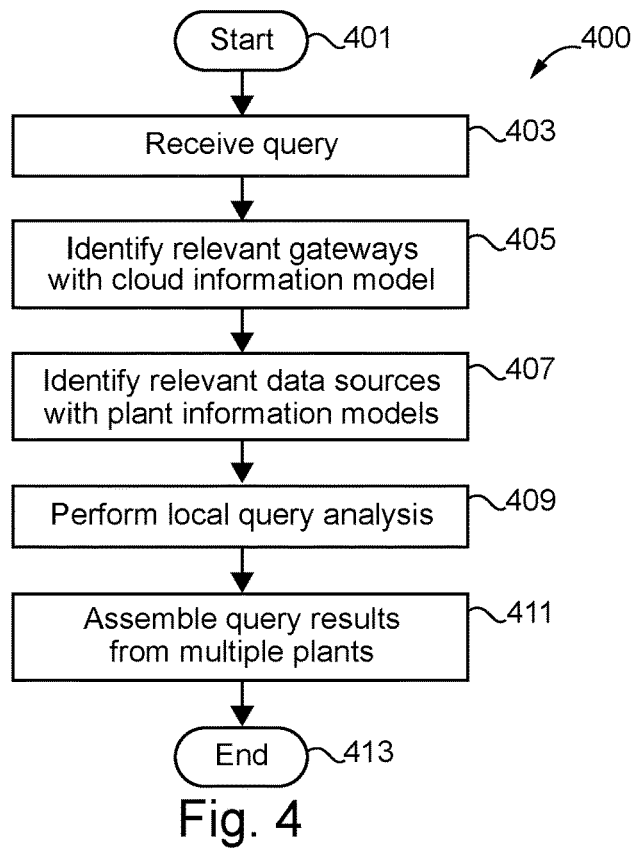
FIG. 4 is a flowchart illustrating an exemplary query process.

With reference to FIG. 4, there is illustrated an exemplary process 400 for answering a query using an exemplary federated information model. Process 400 may be implemented in whole or in part in one or more of the monitoring systems disclosed herein, such as monitoring system 100 of FIG. 1.

The processes in the present application may be implemented with programming instructions as operations by software, hardware, artificial intelligence, fuzzy logic, or any combination thereof, or at least partially performed by a user or operator. In certain embodiments, units represent software elements as a computer program encoded on a non-transitory computer readable medium performing the described operations when executing the computer program.

Process 400 begins at start operation 401 and proceeds to operation 403 where monitoring system 100 receives a query from user interface 140. Process 400 proceeds to operation 405 where computing device 110 determines the gateways with data and information models required to answer the query using the cloud information model.

Process 400 proceeds to operation 407 where gateway 121 located at industrial plant 120 and gateway 131 located at industrial plant 130 each receive a portion of the query from computing device 110. Gateway 121 identifies relevant data sources using plant information model 123. Gateway 131 identifies relevant data sources using plant information model 133. Process 400 proceeds to operation 409 where gateways 121 and 131 perform local query analysis using the relevant data identified. The result of the analysis is a summary which does not include the raw data received from the industrial devices or stored in databases of the industrial plants.

Process 400 proceeds to operation 411 where gateways 121 and 131 transmit the results of the query analysis to computing device 110 which assembles the received results into a query answer. Process 400 proceeds to end operation 413.

It shall be further appreciated that a number of variations and modifications to process 400 are contemplated including, for example, the omission of one or more aspects of process 400, the addition of further conditionals and operations and/or the reorganization or separation of operations and conditionals into separate processes.

Figure 5:
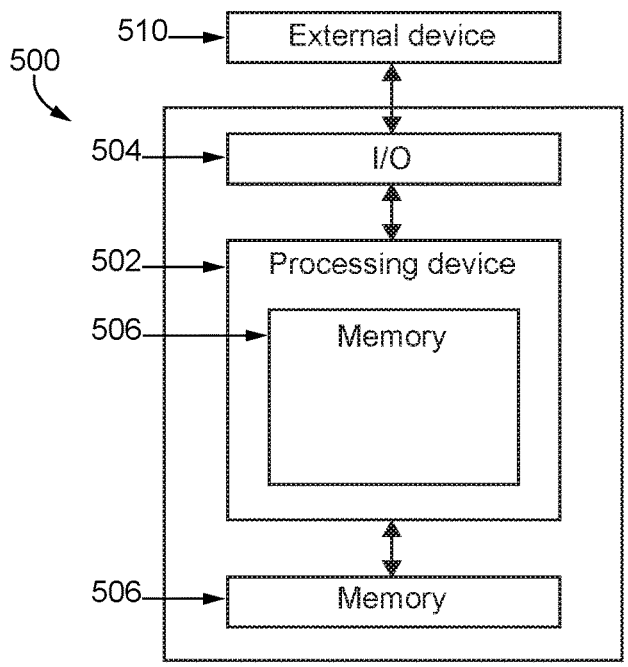
FIG. 5 is a schematic block diagram illustrating an exemplary computing device.

With reference to FIG. 5, there is illustrated a schematic block diagram of a computing device 500. Computing device 500 is one example of a gateway or cloud computing device which is used, in different embodiments, in connection with an exemplary monitoring system, such as system 100 shown in FIG. 1. Computing device 500 includes a processing device 502, an input/output device 504, and a non-transitory memory medium 506. Computing device 500 may be a stand-alone device, an embedded system, or a plurality of devices structured to perform the functions described with respect to monitoring system 100. Non-transitory memory medium 506 may comprise a single memory device, or multiple memory devices located at a commonly accessible network location and operable in concert to provide non-transitory memory storage. Furthermore, computing device 500 communicates with one or more external devices 510.

Input/output device 504 enables the computing device 500 to communicate with external device 510. For example, input/output device 504 in different embodiments may be a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 504 is comprised of hardware, software, and/or firmware. It is contemplated that input/output device 504 includes more than one of these adapters, credentials, or ports, such as a first port for receiving data and a second port for transmitting data.

External device 510 in different embodiments is any type of device that allows data to be input or output from computing device 500, such as a user interface or a separate cloud computing system. For example, external device 510 in different embodiments is a mobile device, a reader device, equipment, a handheld computer, a diagnostic tool, a controller, a computer, a server, a printer, a display, an alarm, a visual indicator, a keyboard, a mouse, a cloud server, or a touch screen display. Furthermore, it is contemplated that external device 510 is be integrated into computing device 500. It is further contemplated that more than one external device is in communication with computing device 500.

Processing device 502 in different embodiments is a programmable type, a dedicated, hardwired state machine, or a combination of these. Device 502 can further include multiple processors, Arithmetic-Logic Units (ALUs), Central Processing Units (CPUs), Digital Signal Processors (DSPs), Field-programmable Gate Array (FPGA), to name but a few examples. For forms of processing device 502 with multiple processing units, distributed, pipelined, or parallel processing can be used as appropriate. Processing device 502 may be dedicated to performance of just the operations described herein or may be utilized in one or more additional applications. In the illustrated form, processing device 502 is of a programmable variety that executes processes and processes data in accordance with programming instructions (such as software or firmware) stored in non-transitory memory medium 506. Alternatively or additionally, programming instructions are at least partially defined by hardwired logic or other hardware. Processing device 502 can be comprised of one or more components of any type suitable to process the signals received from input/output device 504 or elsewhere, and provide desired output signals. Such components may include digital circuitry, analog circuitry, or a combination of both.

Non-transitory memory medium 506 in different embodiments is of one or more types, such as a solid-state variety, electromagnetic variety, optical variety, or a combination of these forms, to name but a few examples. Furthermore, some or all of non-transitory memory medium 506 can be of a portable variety, such as a disk, tape, memory stick, cartridge, to name but a few examples. In addition, non-transitory memory medium 506 can store data that is manipulated by processing device 502, such as data representative of signals received from or sent to input/output device 504 in addition to or in lieu of storing programming instructions, just to name one example. As shown in FIG. 6, non-transitory memory medium 506 may be included with processing device 502 or coupled to processing device 502, but need not be included with both.

Further written description of a number of exemplary embodiments shall now be provided. One embodiment is a system for remote monitoring of an industrial plant, the system comprising a cloud-based computing component structured to store and to access a cloud portion of a federated information model; a plurality of industrial plant-based gateway components in operative communication with the cloud-based computing component, each of the gateway components structured to store and to access respective gateway portions of the federated information model, the respective gateway portions of the federated information model being isolated from access by the cloud-based computing component; and a plurality of industrial plant asset controllers each in operative communication with at least one of the gateway components, each of the asset controllers structured to store and to access respective asset portions of the federated information model; wherein the cloud-based computing component is structured to receive a user-initiated query for information of one or more assets of the industrial plant and, in response to the user-initiated query, utilize the cloud portion of the federated information model to identify one or more portions of the query associated by the cloud portion of the federated information model with one or more of the gateway components and to transmit the identified one or more portions of the query to one or more associated gateway components, the gateway components are structured to receive respective one or more portions of the query and, in response to the received one or more portions of the query, utilize their respective gateway portions of the federated information model to identify one or more of the industrial plant asset controllers to interrogate with the received one or more portions of the query, the industrial plant asset controllers are structured to one of identify and obtain data responsive to the interrogation by the respective industrial plant-based gateway components and to transmit the identified responsive data to the respective industrial plant-based gateway components, the industrial plant-based gateway components are further structured to provide the identified responsive data to the cloud-based computing component, and the cloud-based computing component is further structured to utilize the identified responsive data received from the plurality of plant-based gateway components to generate an aggregated response to the user-initiated query and to output the response in a user perceptible format.

In certain forms of the foregoing system, the cloud portion of the federated information model includes query mapping information for the gateway portions of the federated information model. In certain forms, the gateway portions of the federated information model include interrogation mapping information for the industrial plant asset controllers. In certain forms, the asset portions of the federated information model are isolated from access by the gateway components and isolated from access by the cloud-based computing component. In certain forms, one or more of the industrial plant-based gateway components provide a firewall restricting access to a network including one or more of the industrial plant asset controllers.

Another exemplary embodiment is a method for remote monitoring of an industrial plant, the method comprising providing a distributed computing system including a cloud-based computing component structured to store and to access a cloud portion of a federated information model, a plurality of industrial plant-based gateway components in operative communication with the cloud-based computing component, each of the gateway components structured to store and to access respective gateway portions of the federated information model, the respective gateway portions of the federated information model being isolated from access by the cloud-based computing component, and a plurality of industrial plant asset controllers each in operative communication with at least one of the gateway components, each of the asset controllers structured to store and to access respective asset portions of the federated information model; operating the cloud-based computing component to receive a user-initiated query for information of one or more assets of the industrial plant and, in response to the user-initiated query, utilize the cloud portion of the federated information model to identify one or more portions of the query associated by the cloud portion of the federated information model with one or more of the gateway components and to transmit the identified one or more portions of the query to one or more associated gateway components; operate the gateway components to receive respective one or more portions of the query and, in response to the received one or more portions of the query, utilize their respective gateway portions of the federated information model to identify one or more of the industrial plant asset controllers to interrogate with the received one or more portions of the query, operate the industrial plant asset controllers to one of identify and obtain data responsive to the interrogation by the respective industrial plant-based gateway components and to transmit the identified responsive data to the respective industrial plant-based gateway components, operate the industrial plant-based gateway components to provide the identified responsive data to the cloud-based computing component, and operate the cloud-based computing component to utilize the identified responsive data received from the plurality of plant-based gateway components to generate an aggregated response to the user-initiated query and to output the response in a user perceptible format.

In certain forms of the foregoing method, the cloud portion of the federated information model includes query mapping information for the gateway portions of the federated information model. In certain forms, the gateway portions of the federated information model include interrogation mapping information for the industrial plant asset controllers. In certain forms, the asset portions of the federated information model are isolated from access by the gateway components and isolated from access by the cloud-based computing component. In certain forms, one or more of the industrial plant-based gateway components provide a firewall restricting access to a network including one or more of the industrial plant asset controllers. In certain forms, the method comprises operating the gateway components to receive respective one or more portions of the query, and in response to the received one or more portions of the query, utilizing the gateway components to receive data from a historical database stored in memory within one of the gateway components. In certain forms, the first set of industrial plant asset controllers include at least two of a sensor, a CMMS, and an ERP.

A further exemplary embodiment is an industrial plant monitoring system comprising a cloud-based computing device including a first processing device and a first non-transitory computer readable medium structured to store a first portion of a federated information model; a first industrial plant computing device including a second processing device and a second non-transitory computer readable medium structured to store a second portion of the federated information model; a second industrial plant computing device including a third processing device and a third non-transitory computer readable medium structured to store a third portion of the federated information model; and a user interface structured to receive a query from a user and transmit the query to the cloud-based computing device, wherein the first portion of the federated information model includes identifying information for the second portion of the federated information model and the third portion of the information model, wherein the second portion of the federated information model includes identifying information and a set of classifications for each device of a first set of industrial plant devices, wherein the third portion of the federated information model including identifying information and a set of classifications for each device of a second set of industrial plant devices, wherein the cloud-based computing device is structured to divide the query into a first portion and a second portion using the first portion of the information model, wherein the first industrial plant computing device is structured to select a portion of the first set of industrial plant devices in response to receiving the second portion of the query using the set of classifications of the second portion of the federated information model, receive data corresponding to industrial plant operating parameters from the selected portion of the first set of industrial plant devices, and summarize the received data, wherein the second industrial plant computing device is structured to select a portion of the second set of industrial plant devices in response to receiving the second portion of the query using the set of classifications of the second portion of the federated information model, receive data corresponding to industrial plant operating parameters from the selected portion of the second set of industrial plant devices, and summarize the received data, wherein the cloud-based computing device is structured to receive summarized data from the first industrial plant computing device and second industrial plant computing device, and generate a query answer using the summarized data from the first and second industrial plant computing devices.

In certain forms of the foregoing industrial plant monitoring system, the first plant computing device is structured to receive data corresponding to industrial plant operating parameters from the selected portion of the first set of industrial plant devices by accessing a historical database stored in the first plant computing device. In certain forms, the first set of industrial devices includes at least two of a sensor, a CMMS, and an ERP. In certain forms, the first industrial plant computing device is remote from the second industrial plant computing device. In certain forms, one of the industrial devices of the set of industrial devices is structured to store a fourth portion of the federated information model on an industrial device controller. In certain forms, the first portion of the federated information model includes query mapping information for the second and third portions of the federated information model, and wherein the second portion of the federated information model includes query mapping information for the fourth portion of the federated information model. In certain forms, the fourth portion of the federated information model is isolated from access by the first industrial plant computing device and isolated from access by the cloud-based computing device. In certain forms, the first industrial plant computing device provides a firewall restricting access to a network including the industrial device controller.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A system for remote monitoring of an industrial plant, the system comprising:
   a cloud-based computing component structured to store and to access a cloud portion of a federated information model;
   a plurality of industrial plant-based gateway components in operative communication with the cloud-based computing component, each of the gateway components structured to store and to access respective gateway portions of the federated information model, the respective gateway portions of the federated information model being isolated from access by the cloud-based computing component; and a plurality of industrial plant asset controllers each in operative communication with at least one of the gateway components, each of the asset controllers structured to store and to access respective asset portions of the federated information model; wherein the cloud-based computing component is structured to receive a user-initiated query for information of one or more assets of the industrial plant and, in response to the user-initiated query, utilize the cloud portion of the federated information model to identify one or more portions of the query associated by the cloud portion of the federated information model with one or more of the gateway components and to transmit the identified one or more portions of the query to one or more associated gateway components, the gateway components are structured to receive respective one or more portions of the query and, in response to the received one or more portions of the query, utilize their respective gateway portions of the federated information model to identify one or more of the industrial plant asset controllers to interrogate with the received one or more portions of the query, the industrial plant asset controllers are structured to one of identify and obtain data responsive to the interrogation by the respective industrial plant-based gateway components and to transmit the identified responsive data to the respective industrial plant-based gateway components, the industrial plant-based gateway components are further structured to provide the identified responsive data to the cloud-based computing component, and the cloud-based computing component is further structured to utilize the identified responsive data received from the plurality of plant-based gateway components to generate an aggregated response to the user-initiated query and to output the response in a user perceptible format.

2. The system of claim 1 wherein the cloud portion of the federated information model includes query mapping information for the gateway portions of the federated information model.

3. The system of claim 1 wherein the gateway portions of the federated information model include interrogation mapping information for the industrial plant asset controllers.

4. The system of claim 1 wherein the asset portions of the federated information model are isolated from access by the gateway components and isolated from access by the cloud-based computing component.

5. The system of claim 1 wherein one or more of the industrial plant-based gateway components provide a firewall restricting access to a network including one or more of the industrial plant asset controllers.

6. A method for remote monitoring of an industrial plant, the method comprising:

providing a distributed computing system including a cloud-based computing component structured to store and to access a cloud portion of a federated information model, a plurality of industrial plant-based gateway components in operative communication with the cloud-based computing component, each of the gateway components structured to store and to access respective gateway portions of the federated information model, the respective gateway portions of the federated information model being isolated from access by the cloud-based computing component, and a plurality of industrial plant asset controllers each in operative communication with at least one of the gateway components, each of the asset controllers structured to store and to access respective asset portions of the federated information model;

operating the cloud-based computing component to receive a user-initiated query for information of one or more assets of the industrial plant and, in response to the user-initiated query, utilize the cloud portion of the federated information model to identify one or more portions of the query associated by the cloud portion of the federated information model with one or more of the gateway components and to transmit the identified one or more portions of the query to one or more associated gateway components;

operate the gateway components to receive respective one or more portions of the query and, in response to the received one or more portions of the query, utilize their respective gateway portions of the federated information model to identify one or more of the industrial plant asset controllers to interrogate with the received one or more portions of the query, operate the industrial plant asset controllers to one of identify and obtain data responsive to the interrogation by the respective industrial plant-based gateway components and to transmit the identified responsive data to the respective industrial plant-based gateway components, operate the industrial plant-based gateway components to provide the identified responsive data to the cloud-based computing component, and operate the cloud-based computing component to utilize the identified responsive data received from the plurality of plant-based gateway components to generate an aggregated response to the user-initiated query and to output the response in a user perceptible format.

7. The method of claim 6 wherein the cloud portion of the federated information model includes query mapping information for the gateway portions of the federated information model.

8. The method of claim 6 wherein the gateway portions of the federated information model include interrogation mapping information for the industrial plant asset controllers.

9. The method of claim 6 wherein the asset portions of the federated information model are isolated from access by the gateway components and isolated from access by the cloud-based computing component.

10. The method of claim 6 wherein one or more of the industrial plant-based gateway components provide a firewall restricting access to a network including one or more of the industrial plant asset controllers.

11. The method of claim 6 comprising operating the gateway components to receive respective one or more portions of the query, and in response to the received one or more portions of the query, utilizing the gateway components to receive data from a historical database stored in memory within one of the gateway components.

12. The method of claim 6 wherein the first set of industrial plant asset controllers include at least two of a sensor, a CMMS, and an ERP.

13. An industrial plant monitoring system comprising:

a cloud-based computing device including a first processing device and a first non-transitory computer readable medium structured to store a first portion of a federated information model;

a first industrial plant computing device including a second processing device and a second non-transitory computer readable medium structured to store a second portion of the federated information model;

a second industrial plant computing device including a third processing device and a third non-transitory computer readable medium structured to store a third portion of the federated information model; and a user interface structured to receive a query from a user and transmit the query to the cloud-based computing device, wherein the first portion of the federated information model includes identifying information for the second portion of the federated information model and the third portion of the information model, wherein the second portion of the federated information model includes identifying information and a set of classifications for each device of a first set of industrial plant devices, wherein the third portion of the federated information model including identifying information and a set of classifications for each device of a second set of industrial plant devices, wherein the cloud-based computing device is structured to divide the query into a first portion and a second portion using the first portion of the information model, wherein the first industrial plant computing device is structured to select a portion of the first set of industrial plant devices in response to receiving the second portion of the query using the set of classifications of the second portion of the federated information model, receive data corresponding to industrial plant operating parameters from the selected portion of the first set of industrial plant devices, and summarize the received data, wherein the second industrial plant computing device is structured to select a portion of the second set of industrial plant devices in response to receiving the second portion of the query using the set of classifications of the second portion of the federated information model, receive data corresponding to industrial plant operating parameters from the selected portion of the second set of industrial plant devices, and summarize the received data, wherein the cloud-based computing device is structured to receive summarized data from the first industrial plant computing device and second industrial plant computing device, and generate a query answer using the summarized data from the first and second industrial plant computing devices.

14. The industrial plant monitoring system of claim 13 wherein the first plant computing device is structured to receive data corresponding to industrial plant operating parameters from the selected portion of the first set of industrial plant devices by accessing a historical database stored in the first plant computing device.

15. The industrial plant monitoring system of claim 13 wherein the first set of industrial devices includes at least two of a sensor, a CMMS, and an ERP.

16. The industrial plant monitoring system of claim 13 wherein the first industrial plant computing device is remote from the second industrial plant computing device.

17. The industrial plant monitoring system of claim 13 wherein one of the industrial devices of the set of industrial devices is structured to store a fourth portion of the federated information model on an industrial device controller.

18. The industrial plant monitoring system of claim 17 wherein the first portion of the federated information model includes query mapping information for the second and third portions of the federated information model, and wherein the second portion of the federated information model includes query mapping information for the fourth portion of the federated information model.

19. The industrial plant monitoring system of claim 17 wherein the fourth portion of the federated information model is isolated from access by the first industrial plant computing device and isolated from access by the cloud-based computing device.

20. The industrial plant monitoring system of claim 19 wherein the first industrial plant computing device provides a firewall restricting access to a network including the industrial device controller.

* * * * *